United States Patent [19]

Borstel, Jr.

[11] 4,007,578
[45] Feb. 15, 1977

[54] MOWER

[75] Inventor: Eugene C. Borstel, Jr., Oregon City, Oreg.

[73] Assignee: Omark Industries, Inc., Portland, Oreg.

[22] Filed: Dec. 18, 1975

[21] Appl. No.: 641,999

[52] U.S. Cl. .................................. 56/295; 56/192
[51] Int. Cl.[2] ..................................... A01D 55/18
[58] Field of Search ........... 56/290, 295, 255, 192, 56/17.5, 12.7

[56] References Cited
UNITED STATES PATENTS

| 2,963,844 | 12/1960 | Engler | 56/295 |
|---|---|---|---|
| 3,177,640 | 4/1965 | Mott, Jr. | 56/294 |
| 3,395,522 | 8/1968 | Zweegers | 56/295 |
| 3,834,138 | 9/1974 | Gibson | 56/290 |
| 3,884,019 | 5/1975 | Gerzonich | 56/12.7 |
| 3,895,440 | 7/1975 | Pittinger, Jr. | 56/12.7 |

Primary Examiner—Russell R. Kinsey
Attorney, Agent, or Firm—Robert L. Harrington

[57] ABSTRACT

A carrier adapted for rotation about an axis so as to define a circular path at the outermost extension of the carrier. Anchoring means positioned on the carrier at spaced locations along said circular path. A flexible elongate member extending between and fastened to said anchoring means. At least one cutter mounted to the elongate member between a pair of the anchoring means. Said cutters extending outwardly of the circular path and maintained in said extended positions for impact cutting at least partially by the centrifugal force produced by rotation of the carrier. Said flexible member permitting rearward or inward flexing to withdraw the cutter behind the path defined by the carrier upon striking a solid object, e.g. a rock.

5 Claims, 5 Drawing Figures

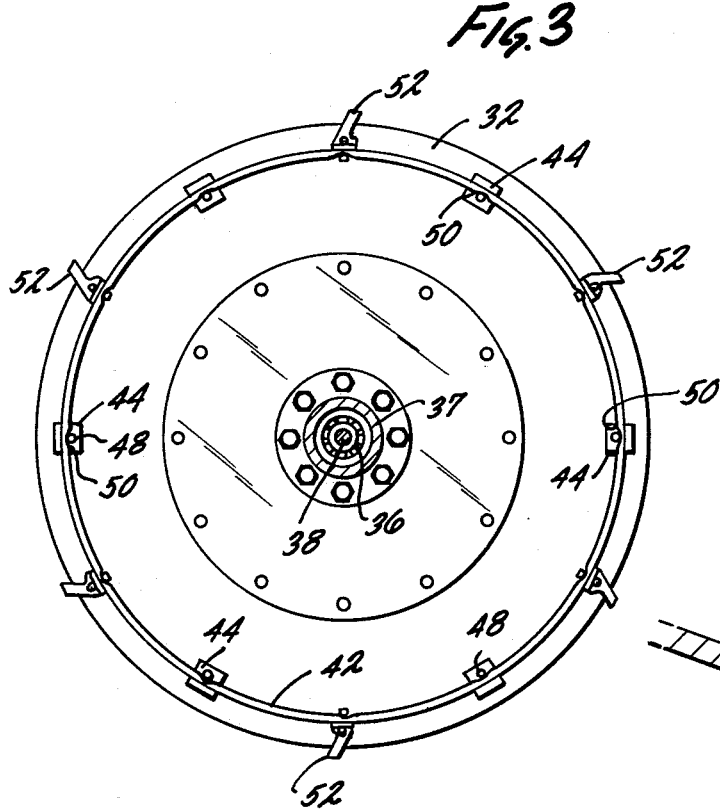
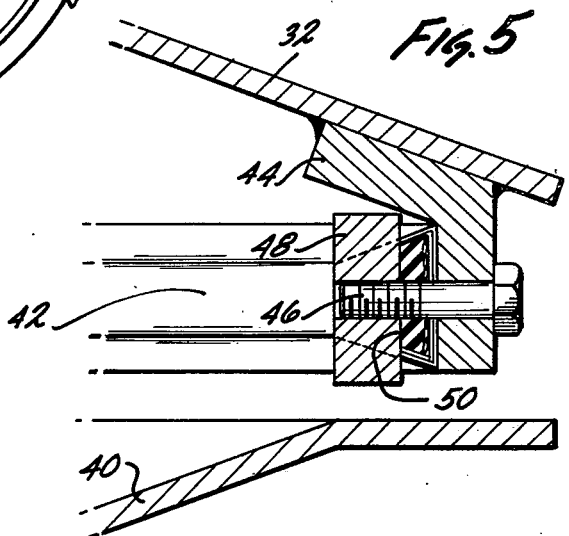
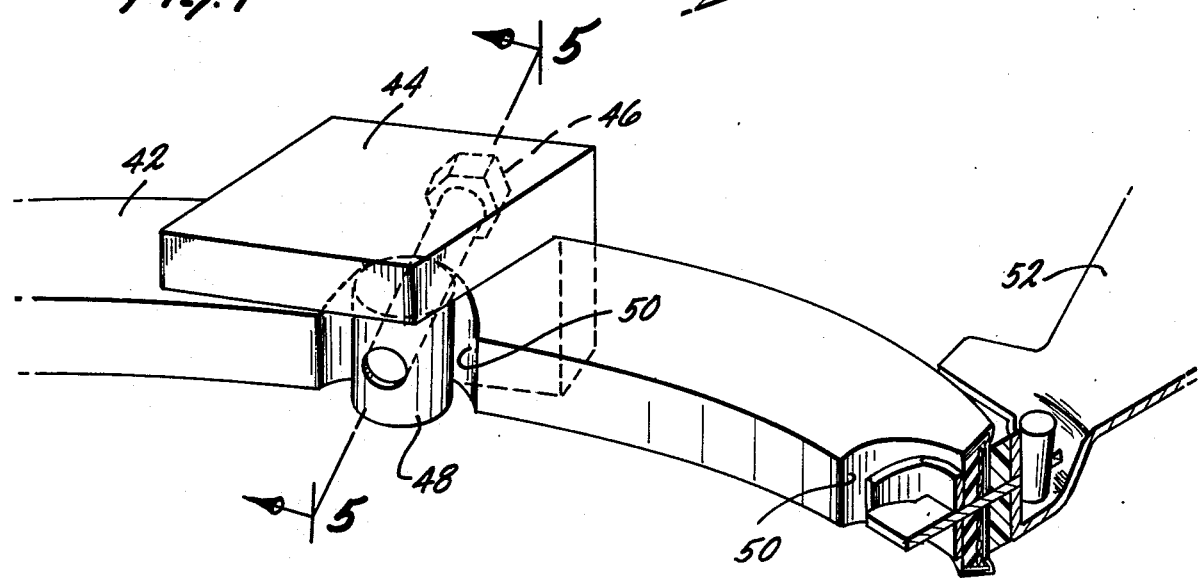

MOWER

HISTORY OF INVENTION

This invention relates to impact mowers for mowing vegetation. More specifically it relates to a novel means for mounting cutters to a drum or disc type mower.

A type of mower referred to as a disc type or drum type mower is designed for impact mowing, see for example U.S. Pat. Nos. 3,389,539 and 3,469,378. A carrier member rotates around a vertical axis, for example a disc like member driven by a vertical shaft. In prior machines the cutters are pivotally connected to the periphery of a disc and function like flails for impact mowing the crop. Upon impact with a rock or the like, the cutters pivot back behind the protective edge of the disc. However, this same pivotal connection is the cause of very rapid wearing which occurs by reason of the repetitive pivoting that occurs in the normal impact cutting of the crops, i.e. the repetitive loading and unloading as the blades contact and cut the crop and then pass around the noncutting rearward side of the disc. The present invention provides protection for the cutters while avoiding the rapid wearing caused by the pivoting cutter.

Very briefly, the present invention is comprised of sections of a flexible elongate member, e.g. a V-belt wherein the ends of the belt sections are anchored to the periphery of a disc like carrier. Sufficient slack is provided in the belt sections to permit flexing outwardly by centrifugal force as the disc is rotated. It will be understood that upon impact of the cutters with solid objects, such as rocks, the flexibility of the belt permits the cutters to be retracted behind the edge of the disc like carrier to prevent cutter breakage. Very simple clamping means provided on the periphery of the disc permits the belts to be easily replaced. Whereas a plurality of belt sections may be provided at different points on the periphery of the disc, the same results can be obtained by a single cutting belt loop designed to fit the periphery of the disc. The belt is anchored to the disc at points between the cutters to provide the desired flexing.

Having thus briefly described the invention, a more complete understanding will be realized by reference of the following detailed description and drawings wherein:

FIG. 3 is a section view taken on lines 3—3 of FIG. 2; and

FIG. 4 is an enlarged view showing a section of the cutting belt and the manner of mounting it to the mower.

FIG. 5 is an enlarged sectional view taken along line 5—5 of FIG. 4.

Figure 1:
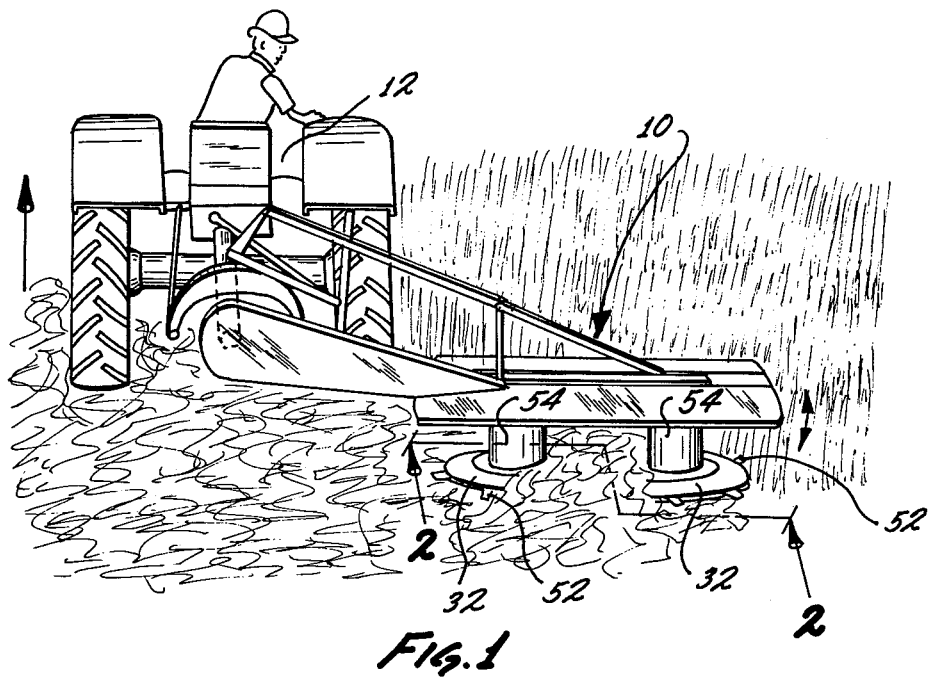
FIG. 1 is a perspective view of a tractor and mower incorporating the present invention and illustrating it in operation.

Referring to the drawings, a drum type mower 10 is mounted to a tractor 12. Although not shown it will be understood that the tractor power take off system is linked to the mower's drive mechanism. This drive mechanism is housed within the support member 14 and includes a drive shaft 16 journaled at its outer end on bearings 18. An axle 20 is interengaged with the drive shaft 16 through gears 22 and 24. Thus rotation of drive shaft 16 produces rotation of the axle 20. The axle 20 is supported in a vertical position by a supporting cylinder 26 which is fixed to the housing 14 by bolt connections 28. Bearings 30 support the axle within the cylinder 26. A collar 32 is mounted to the bottom of the axle through a mounting plate 34 which is bolted to the axle and to the collar. Thus rotation of the axle 20 produces rotation of the collar 32. A bearing hub 37 is mounted to the bottom of the collar and bearings 36 supported in the bearing hub 37 support a spindle 38. The spindle 38 which can rotate independent of the bearing hub and collar carries a guard plate 40.

Figure 2:
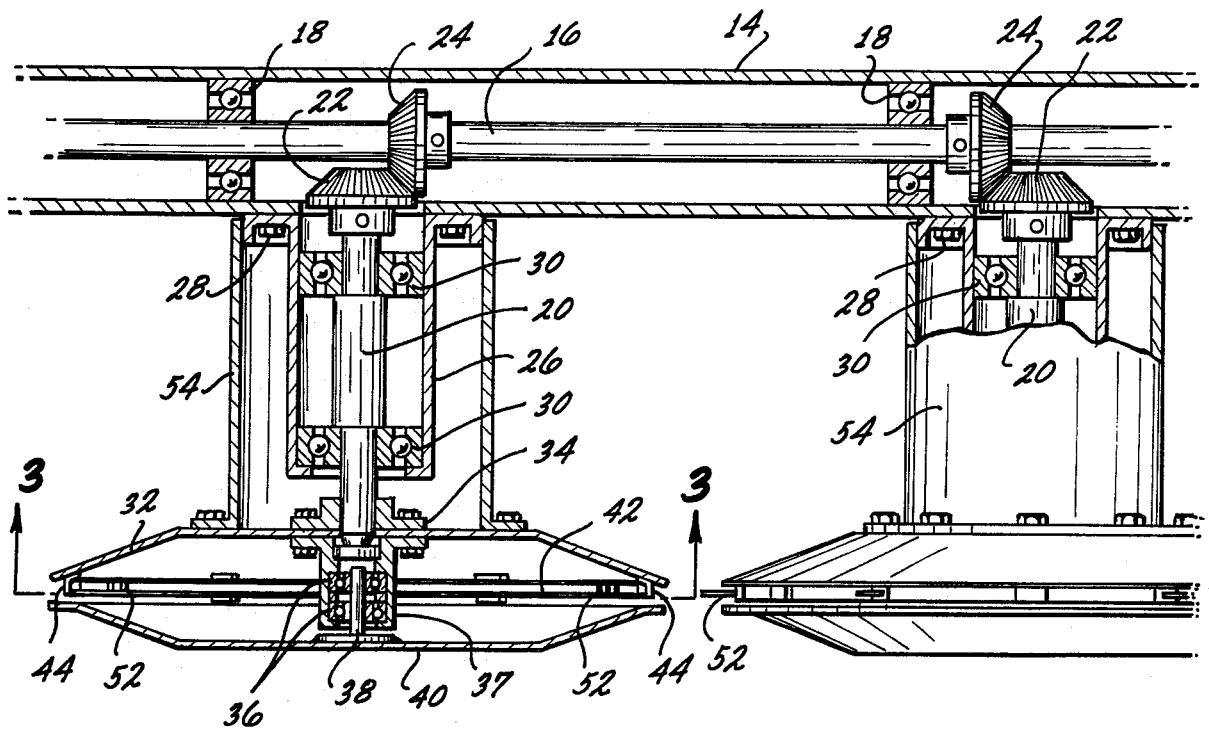
FIG. 2 is a front view partly in section as taken on section lines 2—2 of FIG. 1.

Referring to FIGS. 2, 3, and 4 a cutter support belt 42 is mounted to the collar 32 by inverted L-shaped holders 44 having one leg welded or otherwise fastened to the bottom of the collar adjacent its edge. The cutting belt 42 is preferably a relatively stiff belt as for example a CB rubber V-belt. A bolt 46 passes through the other leg of the holder and through the belt where it threadedly engages a cylindrical nut 48 nested in a cog 50 of the belt. As seen in FIG. 3 of the embodiment illustrated, the cutting belt is fastened to the collar at six locations. Intermediate each of these locations is a cutter 52 mounted to the belt in the manner described in U.S. Pat. No. 3,834,138.

The mower illustrated is operated by the operator engaging the tractor's power take off to rotate the drive shaft 16 which, through gears 22, 24 and axle 20, rotates the collar 32. The cutting belt being fixed to the collar rotates with the collar. The cutters 52 are extended beyond the periphery of the collar as shown so as to cut any standing vegetation in its path. An outer sleeve 54 is fixed to the top of the collar 32 and surrounds the axle and its mounting means to prevent dirt and grass from interfering with the moving parts of the mower. It will be understood that with the disclosed mounting of the belt, i.e. fastened so as to permit flexing at the point where the cutters are attached, upon striking a rock, the belt flexes inwardly behind the protective edges of the collar and guard plate.

Replacement of the cutting belt is accomplished by merely withdrawing the bolt 46 which then releases the belt. Numerous variations of the above described embodiment will become obvious to those skilled in the art without departing from the invention as defined in the claims appended hereto.

What I claim is:

1. A mower including a carrier adapted for rotation about an axis defining a circular path at the outermost extension of the carrier, a flexible elongated member having at least one cutter fastened thereto, and mounting means mounting the elongated member to the carrier at spaced locations substantially in the plane defined by said circular path with the cutter positioned between said locations and extended outwardly of the circular path, and further including guard means comprised of a protective edge adjacent to and inwardly of the outwardly extended cutter whereby upon impact of the cutter with a hard object the flexible elongated member flexes inwardly to withdraw the cutter behind the protective edge.

2. A mower as defined in claim 1 wherein the flexible elongated member is a V-belt.

3. A mower as defined in claim 1 wherein the carrier is a disc shaped collar and the mounting means are positioned on the periphery of the collar.

4. A mower as defined in claim 3 wherein the elongated member is an endless loop flexible V-belt adapted to fit the periphery of the disc and fixed by said mounting means at spaced locations along the periphery of the collar.

5. A mower as defined in claim 4 wherein the mounting means includes a holder fixed to the collar and a bolt extended through the holder and the belt and removably secured by a nut.

* * * * *